US008224698B2

(12) United States Patent
Libby et al.

(10) Patent No.: US 8,224,698 B2
(45) Date of Patent: Jul. 17, 2012

(54) SYSTEM AND METHOD FOR DETERMINING WEIGHTED AVERAGE SUCCESS PROBABILITIES OF INTERNET ADVERTISEMENTS

(75) Inventors: Bradd Libby, Hope Valley, RI (US); Carl A. Dunham, Wakefield, RI (US)

(73) Assignee: The Search Agency, Inc., Santa Monica, CA (US)

( * ) Notice: Subject to any disclaimer, the term of this patent is extended or adjusted under 35 U.S.C. 154(b) by 349 days.

(21) Appl. No.: 12/167,554

(22) Filed: Jul. 3, 2008

(65) Prior Publication Data
US 2010/0004974 A1 Jan. 7, 2010

(51) Int. Cl.
*G06Q 30/00* (2012.01)
(52) U.S. Cl. .................................................. 705/14.52
(58) Field of Classification Search ............... 705/14.52
See application file for complete search history.

(56) References Cited

U.S. PATENT DOCUMENTS

| | | | |
|---|---|---|---|
| 6,044,083 A * | 3/2000 | Citta et al. ..................... 370/441 |
| 7,000,193 B1 * | 2/2006 | Impink et al. .................. 715/771 |
| 7,065,500 B2 | 6/2006 | Singh et al. |
| 7,092,844 B1 * | 8/2006 | Young et al. ................... 702/181 |
| 7,136,875 B2 | 11/2006 | Anderson et al. |
| 7,295,996 B2 | 11/2007 | Skinner |
| 7,548,176 B2 * | 6/2009 | Monro ............................. 341/83 |
| 7,778,872 B2 * | 8/2010 | Kamangar et al. ......... 705/14.52 |
| 2001/0051911 A1 | 12/2001 | Marks et al. |
| 2003/0229531 A1 * | 12/2003 | Heckerman et al. ............ 705/10 |
| 2004/0024626 A1 * | 2/2004 | Bruijning ........................... 705/7 |
| 2004/0107137 A1 | 6/2004 | Skinner |
| 2004/0133469 A1 | 7/2004 | Chang |
| 2004/0199397 A1 | 10/2004 | Dresden |
| 2004/0267806 A1 | 12/2004 | Lester |
| 2005/0049907 A1 * | 3/2005 | Kumar et al. ................... 705/10 |
| 2006/0026063 A1 | 2/2006 | Collins |
| 2007/0005421 A1 | 1/2007 | Labio et al. |
| 2007/0156514 A1 | 7/2007 | Wright et al. |

(Continued)

FOREIGN PATENT DOCUMENTS

EP 1936555 * 6/2008

(Continued)

OTHER PUBLICATIONS

An Empirical Analysis of Sponsored Search Performance in Search Engine Advertising, Ghose, A., Yang, S., WSDM'08, Feb. 11-12, 2008.*

(Continued)

*Primary Examiner* — Charles Kyle
*Assistant Examiner* — Linda Perry
(74) *Attorney, Agent, or Firm* — Verrill Dana, LLP; Chris A. Caseiro (57) ABSTRACT

A method and related system for determining the weighted average conversion (or click-through) probability (WACP) associated with an activity, such as an internet advertising bid activity. The method involves gathering information associated with prior actions relevant to future actions, such as bidding on internet advertisement placement, for example. The gathered information, such as clicks, impressions and conversions resulting from an advertisement placement, is used in an algorithm to calculate the WACP. The method may be carried out as part of a system including one or more computing devices and the execution of instructions embodied in computer-readable media. The algorithm may include the option of weighting the data used, such as by valuing recent data more than older data.

18 Claims, 3 Drawing Sheets

U.S. PATENT DOCUMENTS

| | | | |
|---|---|---|---|
| 2007/0156887 A1 | 7/2007 | Wright et al. | |
| 2007/0165805 A1 | 7/2007 | Altberg et al. | |
| 2007/0174124 A1* | 7/2007 | Zagofsky et al. | 705/14 |
| 2007/0260520 A1 | 11/2007 | Jha et al. | |
| 2008/0004955 A1 | 1/2008 | Mathew et al. | |
| 2008/0010144 A1 | 1/2008 | Chatwin et al. | |
| 2008/0046316 A1 | 2/2008 | Shah et al. | |
| 2008/0103903 A1* | 5/2008 | Flake et al. | 705/14 |
| 2008/0275757 A1* | 11/2008 | Sharma et al. | 705/10 |
| 2009/0048925 A1* | 2/2009 | Song et al. | 705/14 |
| 2009/0119172 A1* | 5/2009 | Soloff | 705/14 |
| 2009/0259550 A1* | 10/2009 | Mihelich et al. | 705/14.42 |
| 2010/0268665 A1* | 10/2010 | Lutnick et al. | 705/36 R |

FOREIGN PATENT DOCUMENTS

WO     WO2008092145    *   1/2008

OTHER PUBLICATIONS

The Search Marketing Newsletter, Kitts, B., iProspect®, Jan. 2005 (4)1, and Feb. 2005, (4)2.*

Statistical Analysis for Decision Making, Hamburg, M., Young, P., copyright 1994, 1991, 1987, 1977, 1970, Harcourt Brace & Company, selected pages.*

* cited by examiner

SYSTEM AND METHOD FOR DETERMINING WEIGHTED AVERAGE SUCCESS PROBABILITIES OF INTERNET ADVERTISEMENTS

BACKGROUND OF THE INVENTION

1. Field of the Invention

The present invention relates to systems and methods for calculating effective advertisement placement on the internet. More particularly, the present invention relates to systems and methods to assist advertisers to determine where and when to spend their advertising money for internet-based ads based on the effective determination of conversion and click-through probabilities.

2. Description of the Prior Art

Search engines such as Google®, Yahoo® and the Microsoft Network (MSN®) have become invaluable tools for companies to market themselves to potential customers. By typing in a search query, a user is provided both with a list of web pages that the search engine itself deems highly relevant to that term (i.e., the main list of 'natural' results), but also with a list of 'sponsored' advertisements in which marketers have agreed to pay the search engine for each user who clicks on the sponsored ad (Cost-Per-Click (CPC)), thus delivering the user to a specific page on the marketer's website. Google also serves text-based ads for display on participating websites via its AdSense™ program, which from advertisers' perspective is conceptually and mechanically little different from advertising on Google's search engine itself.

The position any specific ad appears in the list of sponsored results and the amount which advertisers actually pay is determined by a search-engine-run auction, with higher bidders generally getting a higher position on the list and each bidder paying the smallest incremental amount more than the bidder in the next-lowest position. Because ads are shown on a continuous basis, the auctions are run on a continuous basis, and thus the position, bid and actual CPC of any individual ad can change at any instant.

To each advertiser, search engines regularly provide data concerning, for example, how many times in a given day (or even, a given hour) a particular ad was shown (i.e., the number of ad 'impressions' that occurred). If the ad had only one impression in a given time period, the search engine will tell the advertiser the exact position (from top to bottom) which their ad appeared in the list of competing advertisers' sponsored ads. If the ad was shown multiple times, the engine will provide the average position. To bill the advertiser, the search engine must also tell the advertiser the number of clicks each ad received and the total cost incurred.

For banner ads and other graphic-based ads that appear on a wide variety of websites it is becoming increasingly popular to match advertisers and publishers through ad exchanges such as DART™ (run by DoubleClick, a subsidiary of Google), RMX™ (the RightMedia Exchange, run by RightMedia, a subsidiary of Yahoo!), and AdECN™, run by Microsoft. Like the search engine sponsored ads themselves, these ad exchanges are typically run on an auction-based system, though advertisers usually agree to pay per 1000 impressions that publishers deliver, rather than on a CPC basis.

The advertisers themselves track the number of visitors they receive from each sponsored ad, be it text-based from a search engine or a graphic-based ad from an ad exchange. They record how many individual pages each visitor views and, ultimately, how many 'conversions' that visitor generates. For companies that take orders for products directly through their website, the act of placing an order would typically be considered a conversion. In cases where the advertiser has multiple products or services for sale at different prices, they will also track the amount spent per order and the cost of the goods sold, to determine the profit per order. For companies that do not typically sell products on-line directly, simply receiving a request through their website for a brochure or a request to be contacted by a sales representative might be considered a conversion. Some companies also (or only) sell advertising space on their website and therefore might track the number of pages each visitor views as the number of conversions, to be able to prove to the advertisers on the site that the company has delivered a promised number of ad impressions.

The basic functions of internet marketing therefore include:

Deciding on which search engines and ad exchanges to place advertisements. Google®, Yahoo® and MSN® collectively garner a majority of the traffic among English-speakers in the U.S., but Baidu™ receives the most in China and Baidu.com, their U.S. subsidiary, is popular with U.S.-based Chinese speakers.

Deciding on which search terms (or publisher's available space) to bid at any given time. (This function also involves the converse act of deciding on which underperforming terms or spaces to discontinue bidding.) For search engine marketing, given the number of brand-related terms and competitors' brand-related terms, plus generic terms common to an industry, plus the common misspellings and variants of those terms, plus terms which should only be considered if some other modifying term does not appear within a search expression, the number of keywords that a typical advertiser must contend with at any given time can run from thousands to hundreds of thousands.

Generating the specific ad text or ad graphic that will be shown. Often, advertisers will have multiple variations of each ad and will randomly show different variations to viewers to determine which variation gets the best response.

Joining together performance data from the search engines, ad exchanges and advertisers. Though it might sound conceptually straightforward, the act of tying a specific conversion to a specific impression (even if the conversion happened many days after the impression) is not a trivial task. The mere act of bringing the search engines' and ad exchanges' data and the advertiser's data together in one place is vital to determining the efficiency and profitability of various ads.

Analyzing trends and gauging the performance of individual ads or groups of ads.

Selecting target metrics and performance goals. Advertisers often gauge the performance of their on-line marketing efforts by either the amount spent per conversion or by the return on investment (ROI) and typically expect a far higher ROI for terms that contain their company's name or product brand names (terms which often deliver high-quality visitors at low cost) than non-brand terms.

Ultimately, though, the primary function of internet auction-based marketing boils down to setting a good bid for each ad. Because advertisers pay per click (or per set of 1000 impressions), even a bid that is only slightly higher than justified can lose small amounts of money per day and, given the difficulty of locating these ads among thousands of similar ads (many of which might normally lose money in any short amount of time), this can add up to a considerable sum. Underbidding for a given ad also carries a risk, that of losing potential customers to competitors.

Even though hundreds of millions of search queries are performed per day worldwide, the enormous number of keywords and search expressions coupled with the fact that clicks are usually only a small percentage of impressions (the click-through rate) and conversions a small percentage of clicks (the conversion rate) means that the amount of recent data available per keyword is often very limited. Therefore, the fundamental task facing a marketer in setting good bids on search engines lies in deriving a good estimate of the per-click conversion probability, even when provided with limited recent performance data.

In more generic terms, if the successful occurrence of an event, such as witnessing the obverse (i.e., 'heads') side of a coin on a given toss, is highly probable on any individual opportunity and many attempts are made for that successful event to occur, then estimation of the per-opportunity probability of success (henceforth called the 'inherent conversion rate') is straightforward. In cases where the inherent conversion rate is not subject to change over time, again such as with a coin toss, simply dividing the number of observed successes by the number of attempts yields a close estimate of the inherent conversion rate when the number of attempts is large. As the number of attempts grows larger, the observed conversion rate tends to more closely approximate the inherent conversion rate, such that the inherent conversion rate can be estimated to any arbitrary degree of accuracy simply by observing a sufficient (and easily calculable) number of attempts.

However, in cases where the successful occurrence of an event is given only a very limited number of opportunities to happen, especially when the per-opportunity probability of success is low, accurate estimation of this inherent probability of success becomes more complex. If the probability of success is not fixed, but instead can change over time, then an accurate estimation of this probability at any given point essentially becomes impossible. For systems where our expected benefit depends strongly on our guess of the inherent success rate, then our best recourse is to select at any time, from the observed data up until that time, an estimated value of the inherent success rate that minimizes, on average, the extent to which our guess is likely to be wrong.

Thus, the need exists for a system and related method that can generate good bid recommendations in an internet-based advertising context for most ads most of the time, even when the available performance data are limited. Further, what is needed is such a system and related method, which can also be used to estimate conversion rates, click-through rates and other factors associated with internet-based advertising.

SUMMARY OF THE INVENTION

It is an object of the present invention to provide a system and related method to generate good bid recommendations in an internet-based advertising context for most ads most of the time, even when the available performance data are limited. Another object of the invention is to enable use of such a system and related method to estimate click-through rates and other factors associated with internet-based advertising.

For simplicity, consider bidding on a single word on a search engine. Assuming that the viewing of an advertisement on a search engine results page (a.k.a., an 'impression') which does not result in the user clicking on the ad and therefore visiting the advertiser's website is of negligible worth, and also that a visit to an advertiser's website that does not result in the purchase of a product or service is also of negligible worth, then the value to the advertiser of a single click on the ad is given by:

$$\text{Value\_per\_Click} = \text{Inherent\_Conversion\_Rate} \times \text{Value\_per\_Conversion} \quad (1)$$

A rational bid in a pay-per-click (PPC) advertising placement scheme would be one that results in paying an actual CPC that is no higher than this quantity, but determining this bid requires an estimate of the value (i.e., profit) per conversion and an estimate of the inherent conversion rate that minimizes, on average, the degree to which the estimate is incorrect.

In some cases, the value per conversion is known exactly and, therefore, need not be estimated from historical data. When this is not the case, the value per conversion must be estimated from historical data, by the time-dependent method described below, by a straight average from recent conversions, or by some other method. In either case, an estimate of the inherent conversion rate must also be determined from whatever (preferably recent) historical data is available. The present invention, referred to herein as the 'weight-averaged conversion (or 'click-through') probability' (WACP), provides the means by which that inherent success rate may be estimated effectively. The invention does so by weighting more recent data to be more important than older data, though this is not a strictly necessary feature of the invention. Further, the present invention characterizes data by the day of the week so that weekday bids can be set differently from weekend bids, for example. These and other advantages of the present invention will become apparent upon review of the following detailed description, the accompanying drawings and the appended claims.

DETAILED DESCRIPTION OF THE PREFERRED EMBODIMENT

Figure 1:
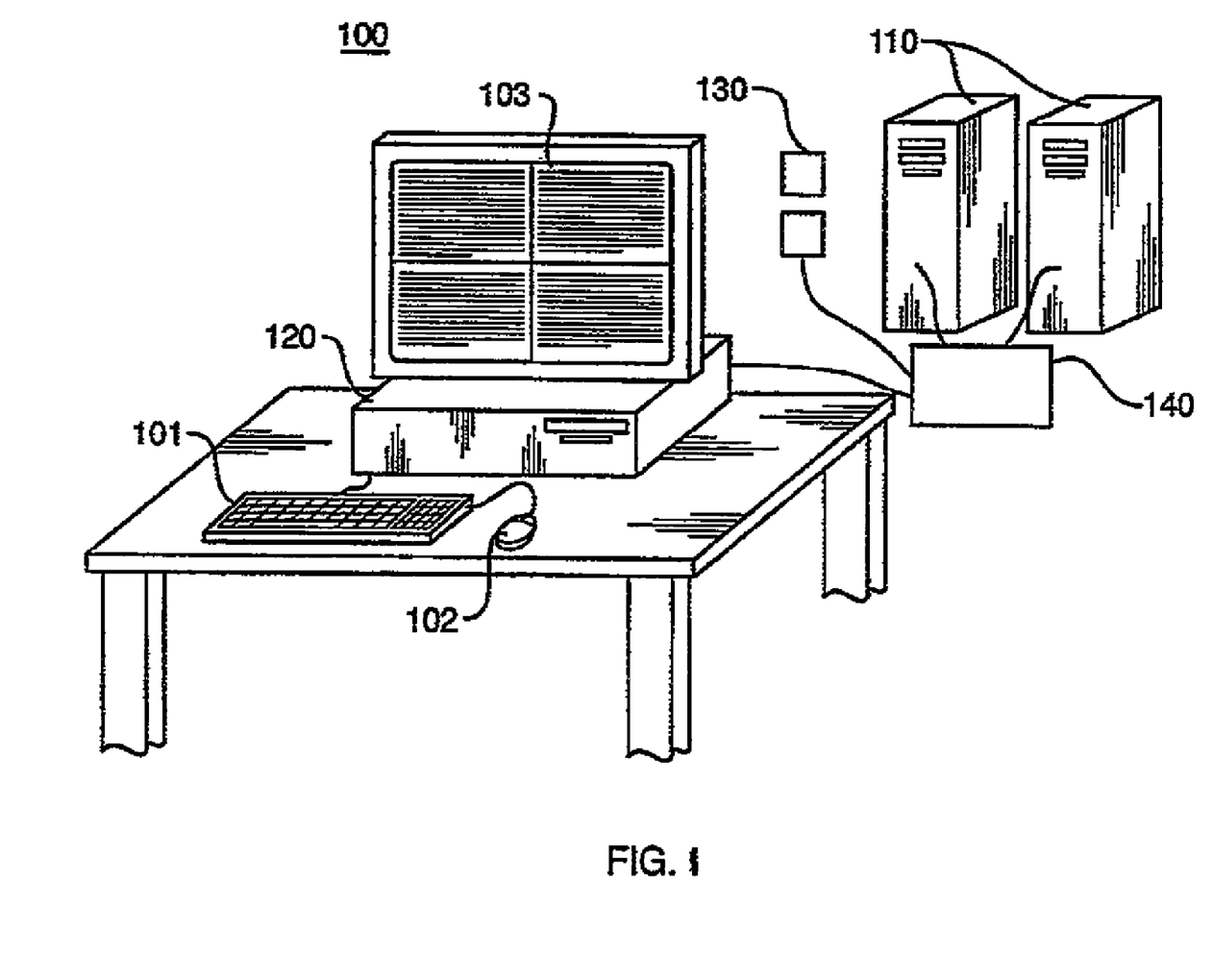
FIG. 1 is a simplified representation of a computer system suitable for performing the functions and steps embodied in the system and method of the present invention.

The present invention is a system 10 and corresponding method for calculating WACP in relation to making advertising bid determinations. The system 10 of the present invention is a set of functions embodied in a computing system programmed to perform functional steps associated with the method described herein. FIG. 1 shows a representation of a computer system 100 suitable for implementing the functions of the system 10. The computer system 100 shown is only one example of a suitable computing environment and is not intended to suggest any limitation as to the scope of use or functionality of the invention. For example, the computer system 100 may be associated with local or remote computing means, such as one or more central computers, such as server 110 in a local area network, a metropolitan area network, a wide area network, or through intranet and internet connections.

The computer system 100 may include one or more discrete computer processor devices, represented by computer processor 120, for example. Examples of well known computing devices that may be suitable for use with the invention include, but are not limited to, personal computers, server computers, hand-held or laptop devices, cell phones, multiprocessor systems, microprocessor-based systems, set top boxes, programmable consumer electronics, network PCs, minicomputers, mainframe computers, distributed computing environments that include any of the above systems or devices, and the like. The computer system 100 may include computer devices operated by one or more users, such as through a desktop, laptop, or servers, and/or one or more providers of services corresponding to one or more functions of the invention.

The server 110, the computer processor 120, or a combination of both may be programmed to include one or more of the functions of the invention system 10. One or more databases represented by database 130 that may be associated with the server 110, the computer processor 120, other computing devices, or any combination thereof, include information related to the use of the system 10. For example, the database 130 may include information of importance to the user. The database 130 may be populated and updated with information that may be used to carry out one or more of the steps associated with the system 10, one or more businesses, or any other information providers. All of the devices may be interconnected through one or more signal exchange devices, such as router/switch 140.

The invention may be described in the general context of computer-executable instructions, such as program modules, being executed by a computer. Generally, program modules include routines, programs, objects, components, data structures, etc. that perform particular tasks or implement particular abstract data types. As indicated above, the system 10 of the present invention may also be practiced in distributed computing environments where tasks are performed by remote processing devices that are linked through a communications network or other data transmission medium. In a distributed computing environment, program function modules and other data may be located in both local and remote computer storage media including memory storage devices.

The computer processor 120 and interactive drives, memory storage devices, databases and peripherals may be interconnected through one or more computer system buses. The system buses may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 100 typically includes a variety of computer readable media. Computer readable media can be any available media that can be accessed by computer system 100 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

The computer system 100 further includes computer storage media in the form of volatile and/or non-volatile memory such as Read Only Memory (ROM) and Random Access memory (RAM). RAM typically contains data and/or program modules that are accessible to and/or operated on by computer processor 120. That is, RAM may include application programs, such as the functions of the system 10 of the present invention, and information in the form of data. The computer system 100 may also include other removable/non-removable, volatile/non-volatile computer storage and access media. For example, the computer system 100 may include a hard disk drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the computer system 100 to perform the functional steps associated with the system 10 and method of the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the computer processor 120. A user may enter commands and information into the computer processor 120 through input devices such as a keyboard 101 and a pointing device 102, commonly referred to as a mouse, trackball or touch pad. Other input devices (not shown) may include a microphone, joystick, game pad, satellite dish, scanner, or the like. These and other input devices are connected to the computer processor 120 through the system bus, or other bus structures, such as a parallel port, game port or a universal serial bus (USB), but is not limited thereto. A monitor 103 or other type of display device is also connected to the computer processor 120 through the system bus or other bus arrangement. In addition to the display 103, the computer processor 120 may be connected to other peripheral output devices, such as printers (not shown).

The computer processor 120 may be configured and arranged to perform functions and steps embodied in computer instructions stored and accessed in any one or more of the manners described. The functions and steps, such as the functions and steps of the present invention to be described herein, individually or in combination, may be implemented as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor 120, instruct the computer processor 120 to perform one or more processes or acts described herein, and/or various examples, variations and combinations thereof. Such instructions may be written in any of a plurality of programming languages, for example, XML, Java, Visual Basic, C, or C++, Fortran, Pascal, python, Eiffel, Basic, COBOL, and the like, or any of a variety of combinations thereof. The computer-readable medium on which such instructions are stored may reside on one or more of the components described above and may be distributed across one or more such components.

Figure 2:
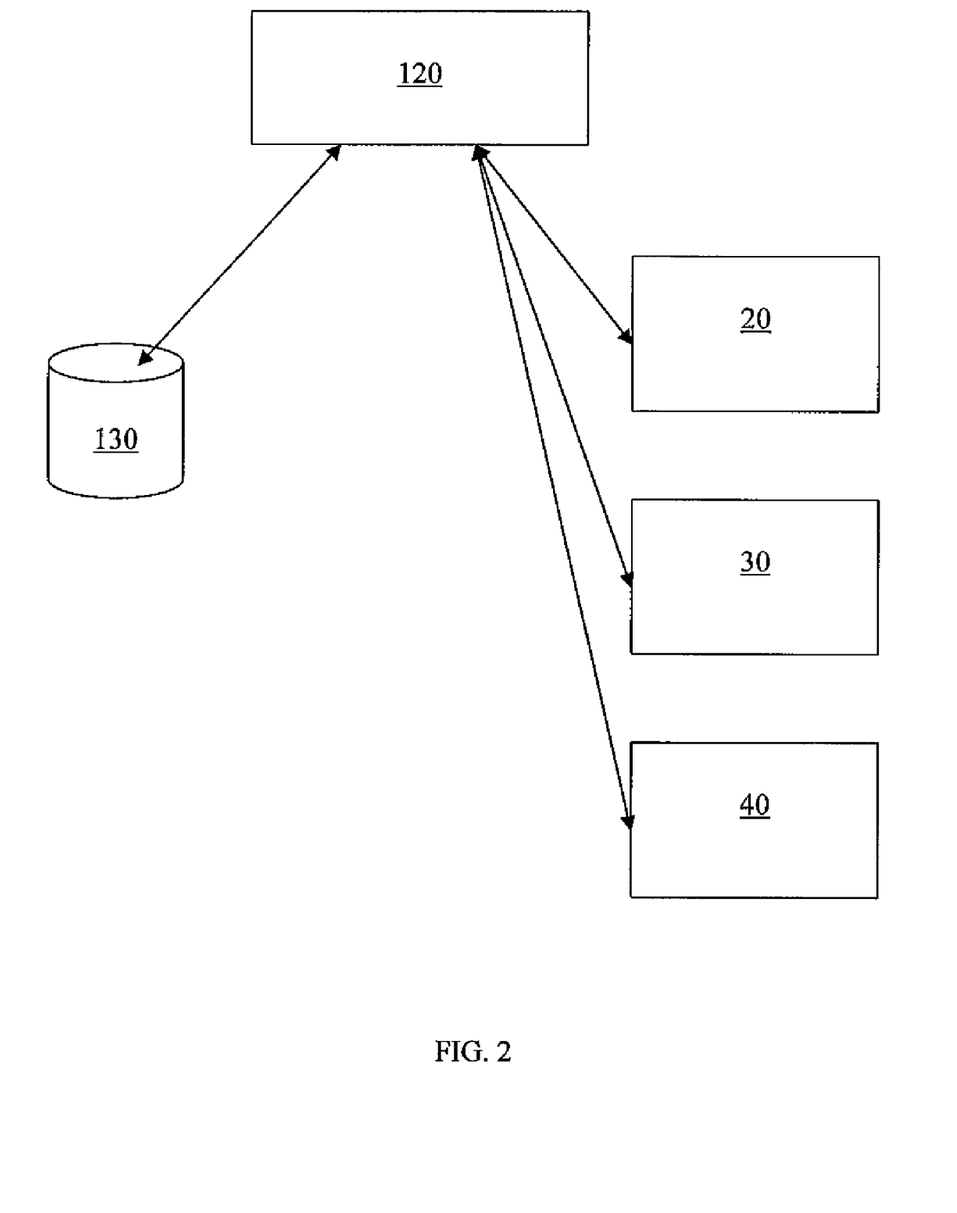
FIG. 2 is a simplified block representation of the system of the present invention and its primary functional components.

With reference to FIG. 2, the system 10 of the present invention includes a plurality of functions embodied in one or more computer programs executable through the computer processor 120 of the computer system 100. Primary functions of the system 10 include a data gathering function 20, a conversion probability function 30 and a bid recommendation output function 40. The system 10 may include other functions and each of the identified primary functions to be described may include one or more subfunctions. The system 10 represented in FIG. 2 may be embodied in one or more computer programs and one or more computer systems as described above. It may be embodied in software, hardware, firmware or any combination thereof. The functions identified may be carried out through the computer processor 120 as a single computing mechanism, or through a plurality of computer processors represented by processor 120. The system 10 may include one or more databases represented by database 130, which database may be embodied in the computer processor 120 or in one or more other computer systems in electronic communication with the computer processor 120. It is to be noted that a result generated using the system 10 of the present invention may or may not be presented on the display 103 of the computer system 100. For example, the output of recommended bid information may be transferred among computer devices, or within a networked computing system, without specific presentation on a display.

While the system 10 and related method of the present invention will be described with respect to an example description of a slot machine representative of maximizing the effectiveness of advertising expenditures, it is noted in general that the system 10 operates as follows. First, with reference to FIG. 2, data are collected using the data gathering function 20. The data include, but are not limited to, information of advertising features, advertising pricing, hits or clicks on advertisements and advertisement location on websites. Next, the data are evaluated using the conversion probability function 30. The success probability calculation is performed to determine the weighted-average success probability corresponding to the conversion (or click-through) rate associated with the number of clicks likely to be achieved based on a particular advertising action. Finally, the determined weighted-average conversion (or click-through) probability information, in a selectable format, such as numbers, words or a combination thereof, if provided, such as an advertising expenditure and placement recommendation, is generated through the bid recommendation function 40.

It is to be noted with respect to operation of the system 10 of the present invention that any system in which a number of attempts are made to generate a successful outcome, each attempt independently having an inherent (but unknown) probability of success, can be thought of as mathematically analogous to a slot machine having R number of reels (one for each attempt) each of which has θ number of equally likely options, one of which represents a successful 'hit' and all θ-1 of the remaining options represent 'misses' (i.e., unsuccessful attempts). The total number of configurations of such a machine is:

$$\text{Total\_Configurations} = \theta^R \quad (2)$$

The number of configurations of this machine which have exactly h number of "hits" is:

$$\text{Configurations\_with\_}h\text{\_hits} = (\theta-1)^{(R-h)} R!/(h!(R-h)!) \quad (3)$$

As is known to those of ordinary skill in the art, in mathematical notation, the use of '!' represents a factorial, i.e., that the preceding integer quantity is multiplied by all previous integers down to the number 1. Thus, '4!' (read as 'four factorial') is 1×2×3×4 (or, 24) and '5!' (read as 'five factorial') is 4!×5 (or, 120). By convention, '0!' is always set to be equal to 1.

The fraction of all possible configurations of R reels that contain exactly h hits is:

$$f = \text{Configurations\_with\_}h\text{\_hits/Total\_Configurations} \quad (4)$$

$$f = ((\theta-1)^{(R-h)}/\theta^R) \times (R!/(h!(R-h)!)) \quad (5)$$

Figure 3:
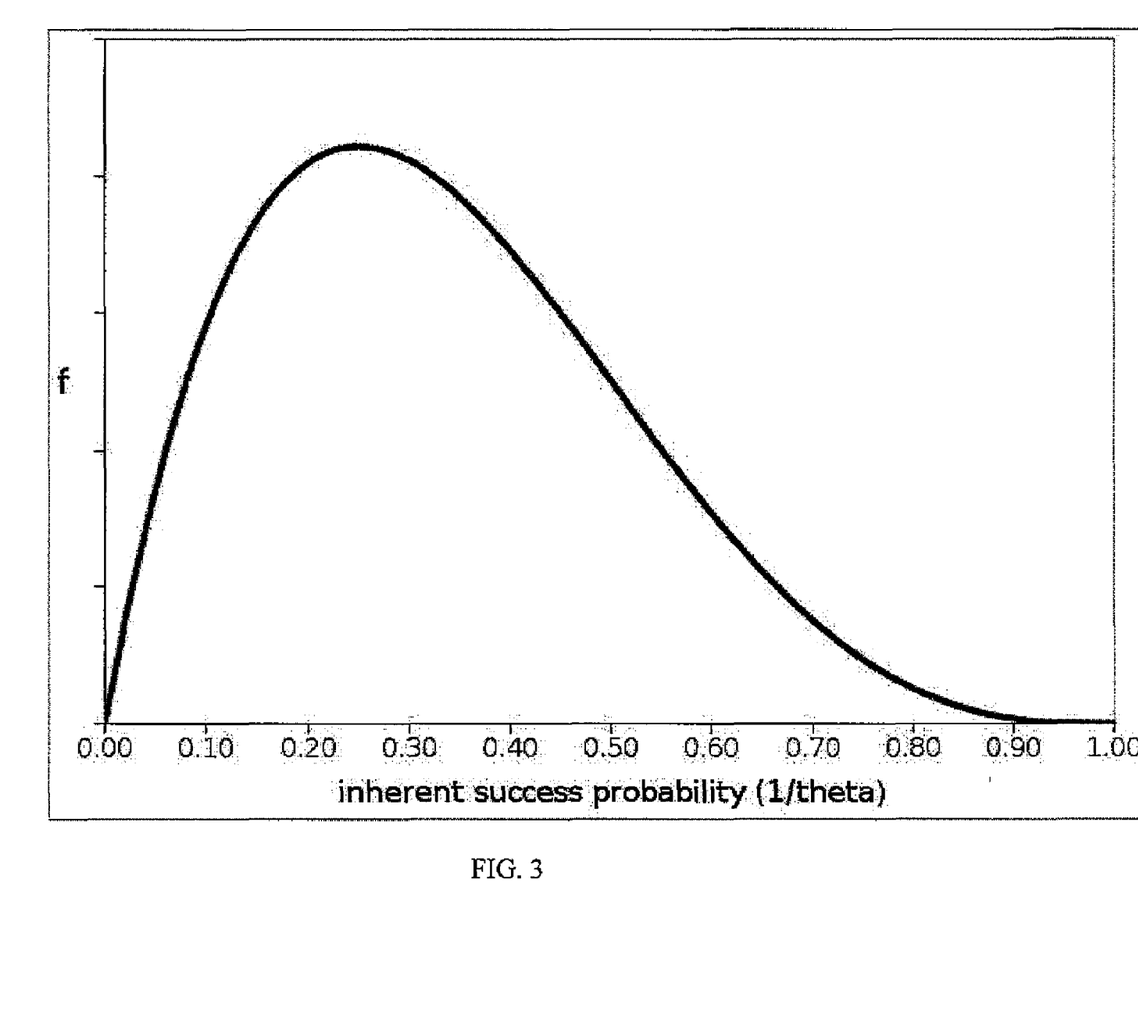
FIG. 3 is a graph of the likelihood vs. inherent success rate in an example determination described herein.

FIG. 3 represents Equation (5) in graphical form for the specific case of four Reels (the equivalent of four clicks on an internet-based advertisement) with one hit (conversion of a click on the advertisement into a sale or prospective sale). The curve represents, for any value of the conversion (or click-through) rate, how likely it is that that conversion (or click-through) rate is the inherent success rate that generated the number of hits observed (h) from the given number of attempts (R). When estimating the inherent conversion rate, R represents clicks and h represents conversions. When estimating the inherent click-through rate, R represents impressions and h represents clicks. The area under this curve is 1/(R+1).

Determining the weight-averaged conversion (or 'click-through') probability (WACP) by averaging over each possible conversion (or click-through) probability (CP), where CP=1/θ, the CP multiplied by the chance that that CP is the value that generated the observed number of hits from the observed number of attempts is simply a matter of solving the integral:

$$\text{WACP} = (R+1) \int f \, CP \, dCP \quad (6)$$

Taking terms that are not functions of CP out of the integral leaves:

$$\text{WACP} = (R+1) \times (R!/(h!(R-h)!)) \times \int ((\theta-1)^{(R-h)}/\theta^{(R+1)}) \, dCP \quad (7)$$

(Note that the R+1 exponent in the denominator of the integral of Equation (7) arises from multiplying $\theta^R$ by CP.) The solution to Equation (7) is:

$$\text{WACP} = (R+hR-h)/(R(R+E)) \quad (8)$$

$$\text{where } E = (2R+hR-2h)/(R(h+1)) \quad (9)$$

This gives a simple algebraic expression for WACP:

$$\text{WACP} = (R+hR-h)/(R(R+(2R+hR-2h)/(R(h+1)))) \quad (10)$$

Equation (10) has the interesting property that WACP is non-zero for finite values of R, even if h=0. That is, even if we have not yet observed a conversion for a given set of clicks (or a click for a given set of impressions), the WACP would still be a calculable value which can be used when bidding.

Equation (10) can be used directly for any R and h observed in any time interval (for example, the past 7 days, or as another example, on Thursdays in the past month). But surprisingly, although R and h are assumed in the slot machine analogy above to be integer quantities, their usage in Equation (10) permits them to have decimal values. If we wish to give higher importance to newer data relative to older data, for example, we can achieve this simply by keeping exponentially weighted moving averages of R and h. If today we saw 0 conversions from 3 clicks and yesterday we saw 1 conversion from 4 clicks and we weight newer and older data to be of equal value, we could simply add those two data sets together, saying that in the past two days we saw 1 conversion from 7 clicks (a ratio of about 14%). However, if we value newer data more than older data such that each day counts as only 50% of the day that follows it, then we would say that yesterday we saw the equivalent of 0.5 conversions from 2.0 clicks. Therefore, our time-weighted aggregate values would say that in the past two days we had seen the equivalent of 0.5 conversions from 5.0 clicks (a ratio of only 10%, reflecting the fact that some of the data is considered less valuable than the rest). Keeping a running exponentially weighted moving average has a computational benefit when dealing with large datasets in that updating a tally of the equivalent number of attempts and successes only requires accessing the current tally and the current day's values and does not require reweighting any previously tallied values.

It is also interesting to note that application of the method described above is not restricted to use in determining bids for on-line advertising but rather Equation (5) is generally applicable to any situation where it is necessary to know the chance that any given success probability is the value that generated a given number (h) of observed successes from a given number (R) of observed attempts. Further, Equation (6) is generally applicable whenever the value per attempt depends linearly on the inherent rate of success, as in Equation (2).

Working with Equation (6) directly also provides a means to determine the margin of error for a given WACP. For example, eliminating the 5% least-likely low probabilities and the 5% least-likely high probabilities (i.e., the upper and lower 5% of the area under the integrand, (R+1)fCP), yields the 90% certainty interval, i.e., the lower and upper conversion probabilities between which we are 90% certain that the inherent conversion probability lies. This is useful both for determining whether a single data set contains sufficient information to determine the inherent success probability to within a certain, arbitrary degree of accuracy. It is also useful for determining whether two separate data sets have weight-averaged conversion (or click-through) probabilities that are statistically similar or statistically dissimilar. When R and h are integers, the lower and upper conversion probabilities for a 90% certainty interval can be determined by using numerical integration to find L (lower) and U (upper) in the equations:

$$\int_0^L f_{norm} dCP = 0.05 \quad (11)$$

and $$\int_0^U f_{norm} dCP = 0.95 \quad (12)$$

In general, any certainty interval can be found by appropriate modification of the values in the right hand sides of Equations (11) and (12). When R and h are decimal values, Equations (11) and (12) can be solved if the factorials in the f-function (Equation 5) are replaced by the Γ-function, a standard mathematical expression that yields values identical to the factorial for inputs which are positive integers, but which is also well-defined for decimal (and even, negative) input values.

The system 10 and related method of the present invention provide an effective means for generating good bid recommendations based upon gathered information related to prior actions. The system 10 and method are effective even when such prior performance data are limited in time and quantity. Specifically, the system 10 and method enable an advertiser to change a computing system to convert gathered performance data into a bid recommendation for each word or device in a given portfolio of advertising options. The system 10 and method enable weighting of such data based on timeliness and period of time of the acquired data. The system 10 and method are embodied in programming stored on computer storage media and used to modify the operation of a computing device to carry out programming instructions to output information of the type described herein. The invention is not limited to estimating conversion (or click-through) probabilities for internet-based advertising. Those skilled in the art will recognize reasonable variants of the invention as described. It is to be understood that various modifications may be made without departing from the spirit and scope of the invention. Accordingly, other embodiments are within the scope of the claims appended hereto.

What is claimed is:

1. A computer-implemented method for determining the weighted-average conversion probability associated with an internet advertisement, the computer-implemented method using a computer system having a plurality of computer-implemented functions, the computer-implemented method comprising the steps of:
   a. executing on the computer system a gathering function that gathers data for storage on a computer-readable medium, the data being associated with an internet advertisement including at least a number of clicks (R) on the internet advertisement and a number of conversions (h); and
   b. executing on the computer system a generating function that generates a weighted average conversion probability (WACP) associated with likely success of that internet advertisement in future use with the equation:

WACP=(R+hR−h)/(R(R+(2R+hR−2h)/(R(h+1))));

wherein the functions are implemented as non-transitory signals encoded on computer-readable media.

2. The computer-implemented method of claim 1 further comprising the step of establishing exponentially weighted moving averages of gathered R and h data and then proceeding with step b of generating the WACP using the exponentially weighted moving averages of gathered R and h data.

3. The computer-implemented method of claim 2 wherein the step of executing on the computer system a function that establishes exponentially weighted moving averages of gathered R and h data includes the step of executing on the computer system a function that values newer data more than older data.

4. The computer-implemented method of claim 2 wherein data are gathered by days of the week and the step of establishing exponentially weighted moving averages of gathered R and h data includes valuing some days' data more than other days' data.

5. The computer-implemented method of claim 1 wherein the step of generating the WACP is used to determine bids for internet advertising.

6. A computer-implemented method for determining the weighted-average click-through probability associated with an internet advertisement, the computer-implemented method using a computer system having a plurality of computer-implemented functions, the computer-implemented method comprising the steps of:
   a. executing on the computer system a gathering function that gathers data for storage on a computer-readable medium, the data being associated with an internet advertisement including at least a number of impressions (R) associated with the internet advertisement and a number of clicks (h) on the internet advertisement; and
   b. executing on the computer system a generating function that generates a weighted average click-through probability (WACP) associated with likely success of that internet advertisement in future use with the equation:

WACP=(R+hR−h)/(R(R+(2R+hR−2h)/(R(h+1))));

wherein the functions are implemented as non-transitory signals encoded on computer-readable media.

7. The computer-implemented method of claim 6 further comprising the step of establishing exponentially weighted moving averages of gathered R and h data and then proceeding with step b of generating the WACP using the exponentially weighted moving averages of gathered R and h data.

8. The computer-implemented method of claim 7 wherein the step of executing on the computer system a function that establishes exponentially weighted moving averages of gathered R and h data includes the step of executing on the computer system a function that values newer data more than older data.

9. The computer-implemented method of claim 7 wherein data are gathered by days of the week and the step of establishing exponentially weighted moving averages of gathered R and h data includes valuing some days' data more than other days' data.

10. The computer-implemented method of claim 6 wherein the step of generating the WACP is used to determine bids for internet advertising.

11. A computer-implemented system configured to assist in determining the weighted-average conversion probability associated with an internet advertisement, the computer-implemented system comprising:
   a. a data gathering function that stores in a database data associated with an internet advertisement including at least a number of clicks (R) on the internet advertisement and a number of conversions (h); and
   b. a conversion probability function that generates a weighted average conversion probability (WACP) associated with likely success of the internet advertisement in future use with the equation:

$WACP=(R+hR-h)/(R(R+(2R+hR-2h)/(R(h+1))))$.

12. The computer-implemented system of claim 11 wherein the conversion probability function calculates exponentially weighted moving averages of gathered R and h data and uses the calculated exponentially weighted moving averages of gathered R and h data to generate the WACP.

13. The computer-implemented system of claim 12 wherein the conversion probability function values newer data more than older data in generating the WACP.

14. The computer-implemented system of claim 12 wherein data are stored in the database by days of the week and the conversion probability function values some days' data more than other days' data in generating the WACP.

15. A computer-implemented system configured to assist in determining the weighted-average conversion probability associated with an internet advertisement, the computer-implemented system comprising:
   a. a data gathering function that stores in a database data associated with an internet advertisement including at least a number of impressions (R) associated with the internet advertisement and a number of clicks (h) on the internet advertisement; and
   b. a conversion probability function that generates a weighted average click-through probability (WACP) associated with likely success of the internet advertisement in future use with the equation:

$WACP=(R+hR-h)/(R(R+(2R+hR-2h)/(R(h+1))))$.

16. The computer-implemented system of claim 15 wherein the conversion probability function calculates exponentially weighted moving averages of gathered R and h data and uses the calculated exponentially weighted moving averages of gathered R and h data to generate the WACP.

17. The computer-implemented system of claim 16 wherein the conversion probability function values newer data more than older data in generating the WACP.

18. The computer-implemented system claim 16 wherein data are stored in the database by days of the week and the conversion probability function values some days' data more than other days' data.

* * * * *